United States Patent [19]
Shimbo

[11] Patent Number: 5,798,900
[45] Date of Patent: Aug. 25, 1998

[54] PAUSE MECHANISM FOR CASSETTE TAPE RECORDER

[75] Inventor: Takaichi Shimbo, Tokyo, Japan

[73] Assignee: MEC Co., Ltd., Tokyo, Japan

[21] Appl. No.: 778,188

[22] Filed: Jan. 2, 1997

[51] Int. Cl.$^6$ ........................................... G11B 5/02
[52] U.S. Cl. ................................................. 360/137
[58] Field of Search ..................................... 360/137

[56] References Cited

U.S. PATENT DOCUMENTS 4,788,610  11/1988  Arata ........................................ 360/137

Primary Examiner—Robert S. Tupper
Attorney, Agent, or Firm—Greenblum & Bernstein P.L.C.

[57] ABSTRACT

A pause mechanism for a cassette tape recorder having a drive mechanism for accomplishing modes, such as a record mode, a playback mode, a fast forward mode and a fast rewind mode, and a switch for enabling or disabling the modes, comprises a lever for setting the switch on or off. The lever is designed to have a double-lever structure in such a manner that when a pause lever is operated in each of the modes, the switch can be set on or off without operating each mode lever.

3 Claims, 11 Drawing Sheets

PAUSE MECHANISM FOR CASSETTE TAPE RECORDER

BACKGROUND OF THE INVENTION

1. Field of the Invention

The present invention relates to a pause mechanism for a cassette tape recorder, and, more particularly, to a pause mechanism for a cassette tape recorder, which uses a switch lever having a double-lever structure to ensure the provision of a pause lever within narrow space while permitting the enabling and disabling of a mode switch.

2. Description of the Related Art

In general, small cassette tape recorders like microcassette mechanisms have limited space which makes it difficult to provide a mechanical pause mechanism in the narrow space. The conventional pause function therefore requires a separate electrical switch which is to be enabled and disabled by a small knob.

When such a separate switch is operated using a small knob as in the conventional method, however, users should be careful to check if the knob is set in the ON position or the OFF position. Users often fail to notice the knob in a pause state.

SUMMARY OF THE INVENTION

Accordingly, it is an object of the present invention to provide a pause mechanism for a cassette tape recorder, which uses a switch lever having a double-lever structure to ensure the provision of a pause lever within narrow space while permitting the enabling and disabling of a mode switch.

To achieve the above object, according to the first aspect of this invention, a pause mechanism for a cassette tape recorder having a drive mechanism for accomplishing modes including a record mode, a playback mode, a fast forward mode and a fast rewind mode, and a switch for enabling or disabling the modes, comprises a lever for setting the switch on or off, the lever being designed to have a double-lever structure in such a manner that when a pause lever is operated in each of the modes, the switch can be set on or off without operating each mode lever.

According to the second aspect of this invention, a pause mechanism for a cassette tape recorder having a lock cam for locking and unlocking a pause lever, comprises a pause portion, provided at a part of the lock cam and pushable by a stop lever, for releasing the lock cam and the pause lever when the stop lever is operated while the lock cam is locking the pause lever.

With the above structures, this invention has the following technical advantages. A user can notice the ON/OFF state of the pause mechanism for a cassette tape recorder at a glance. If the user overlooks the ON/OFF state, however, the user can release this function by depressing the stop lever. This advantage can permit the user to avoid an erroneous usage of the pause mechanism and is very useful as a similar type of a pause mechanism for a cassette tape recorder.

DETAILED DESCRIPTION OF THE PREFERRED EMBODIMENT

Figure 1:
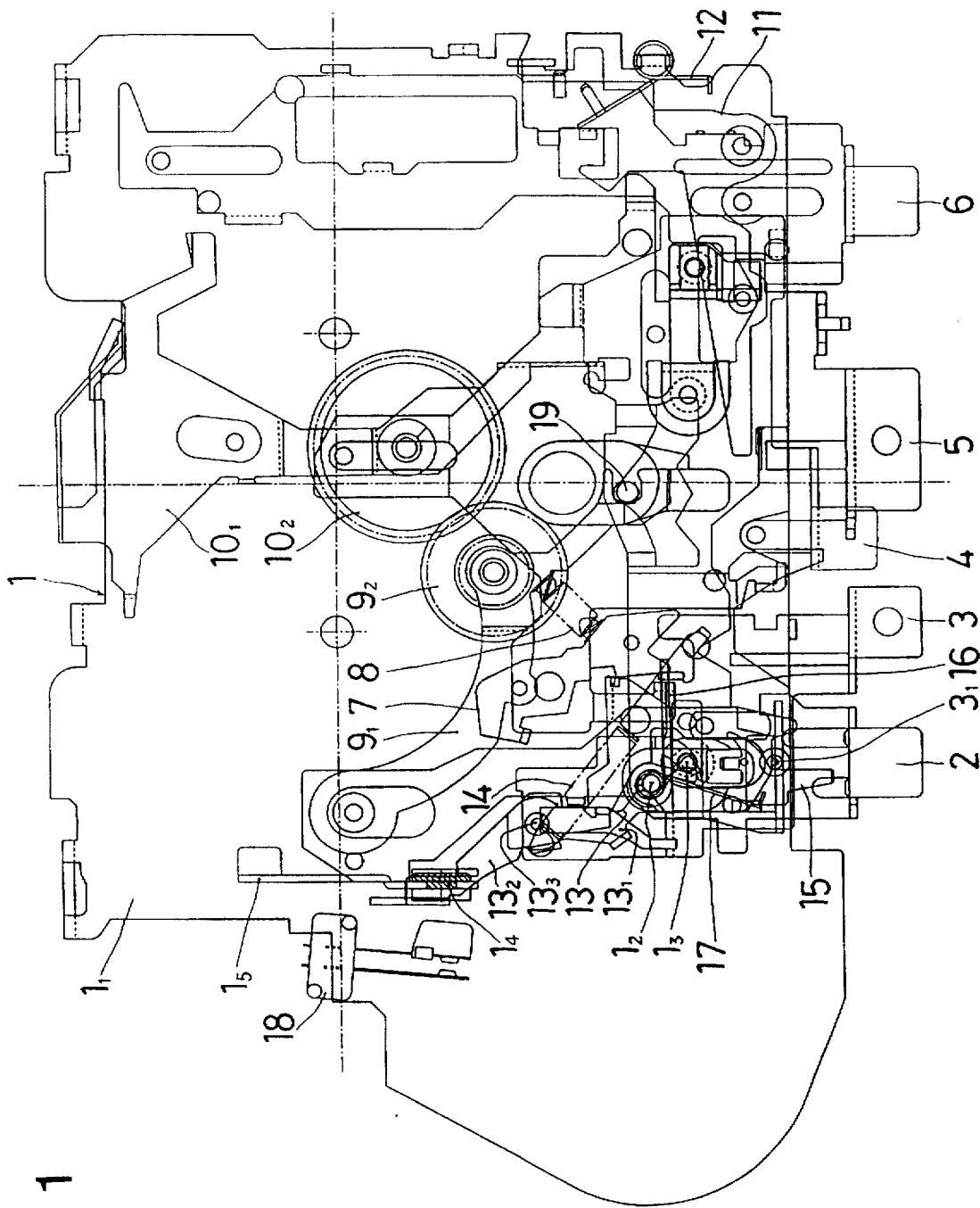
FIG. 1 is a plan view showing a pause mechanism according to this invention installed in a cassette tape recorder.
Figure 2:
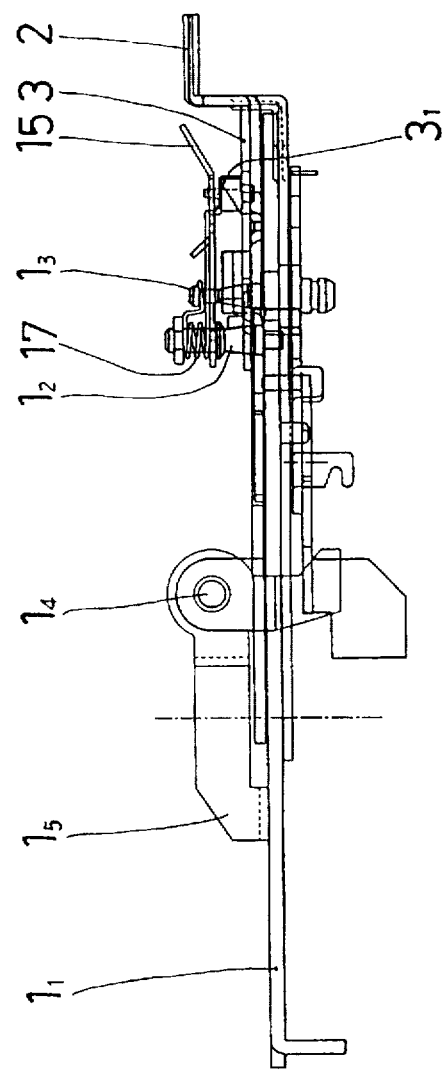
FIG. 2 is a side view of the pause mechanism in FIG. 1.
Figure 3:
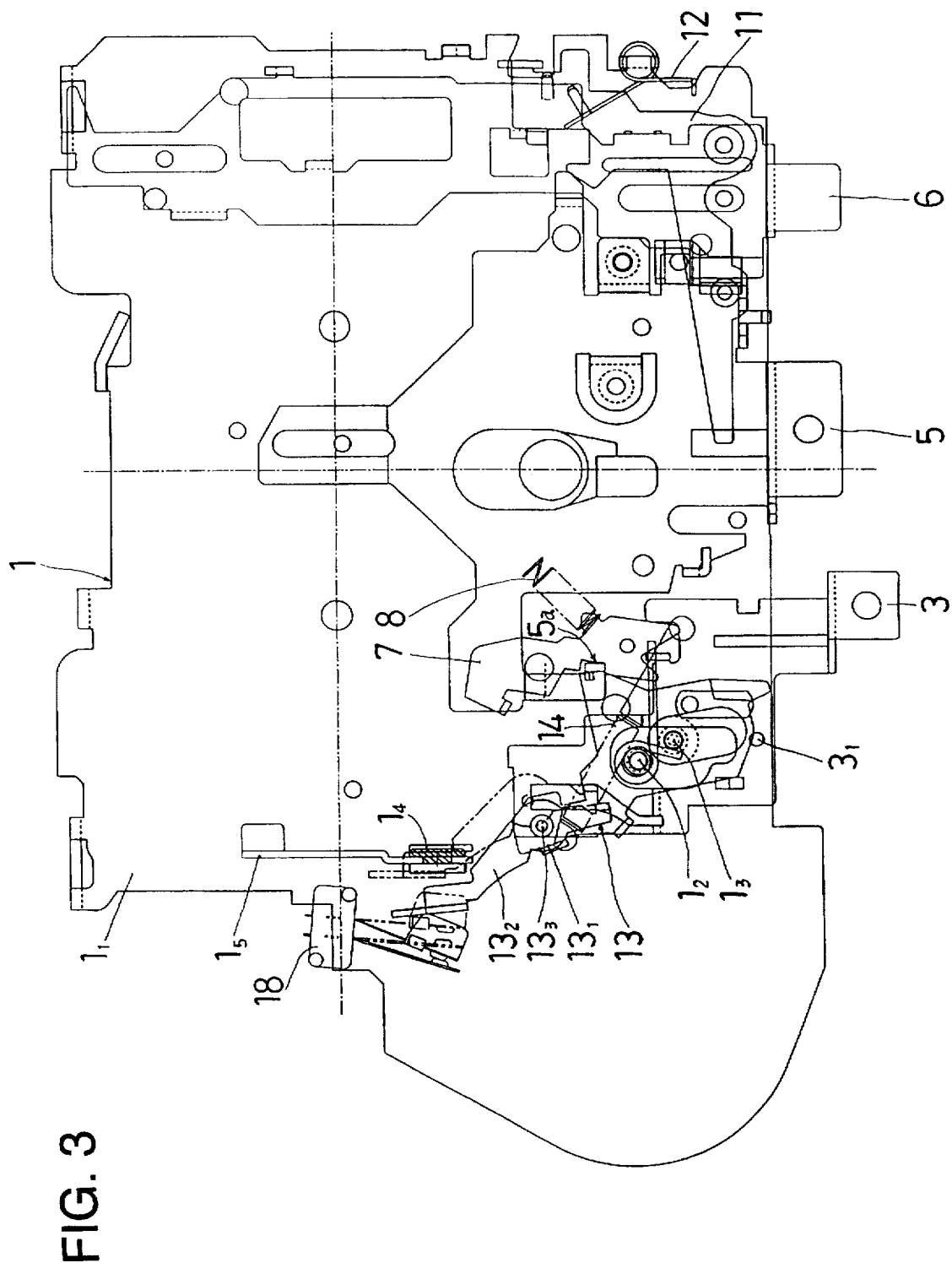
FIG. 3 is a plan view showing the pause mechanism in a playback mode.
Figure 4:
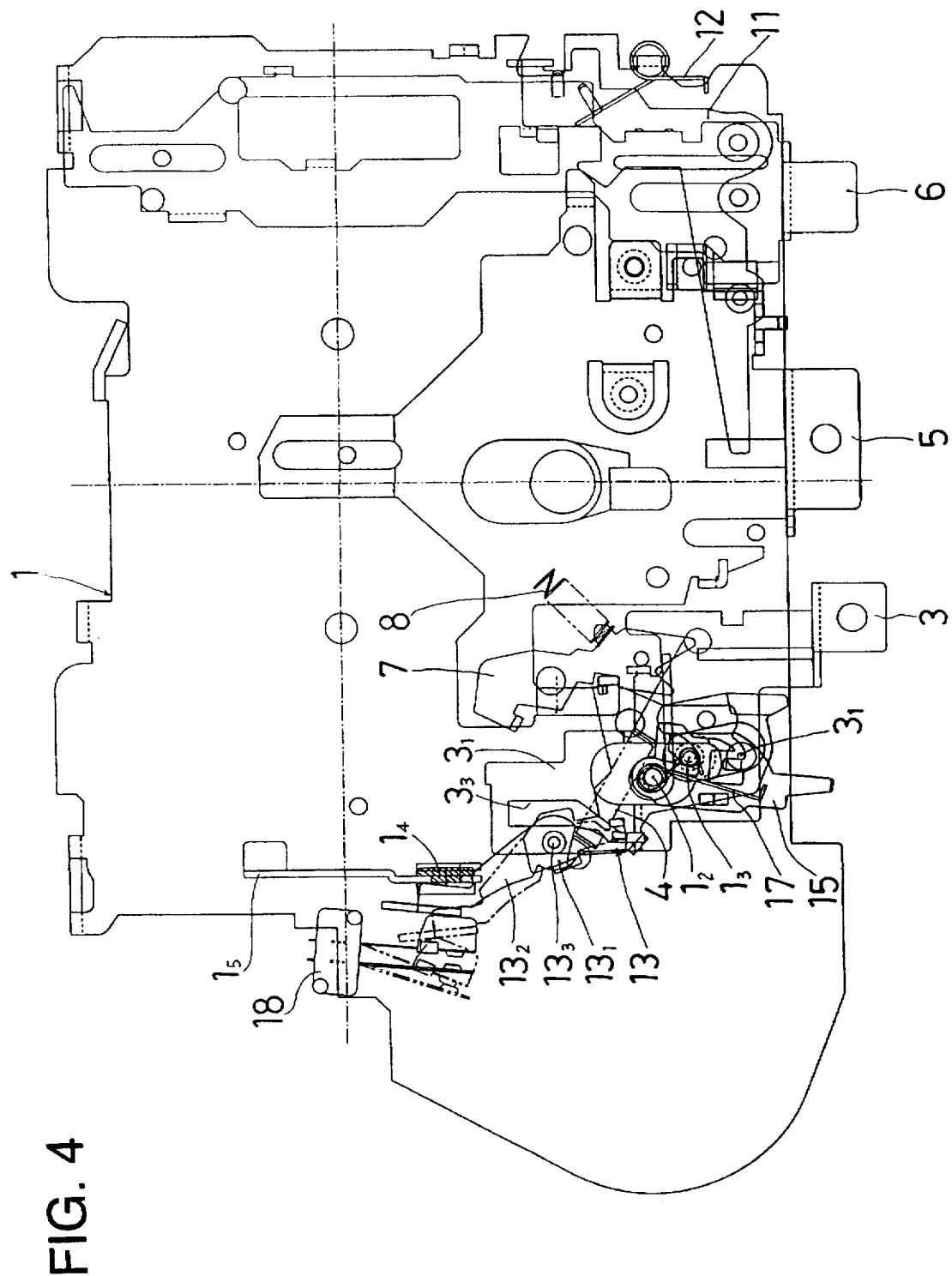
FIG. 4 is a plan view showing the pause mechanism in a stop mode.
Figure 5:
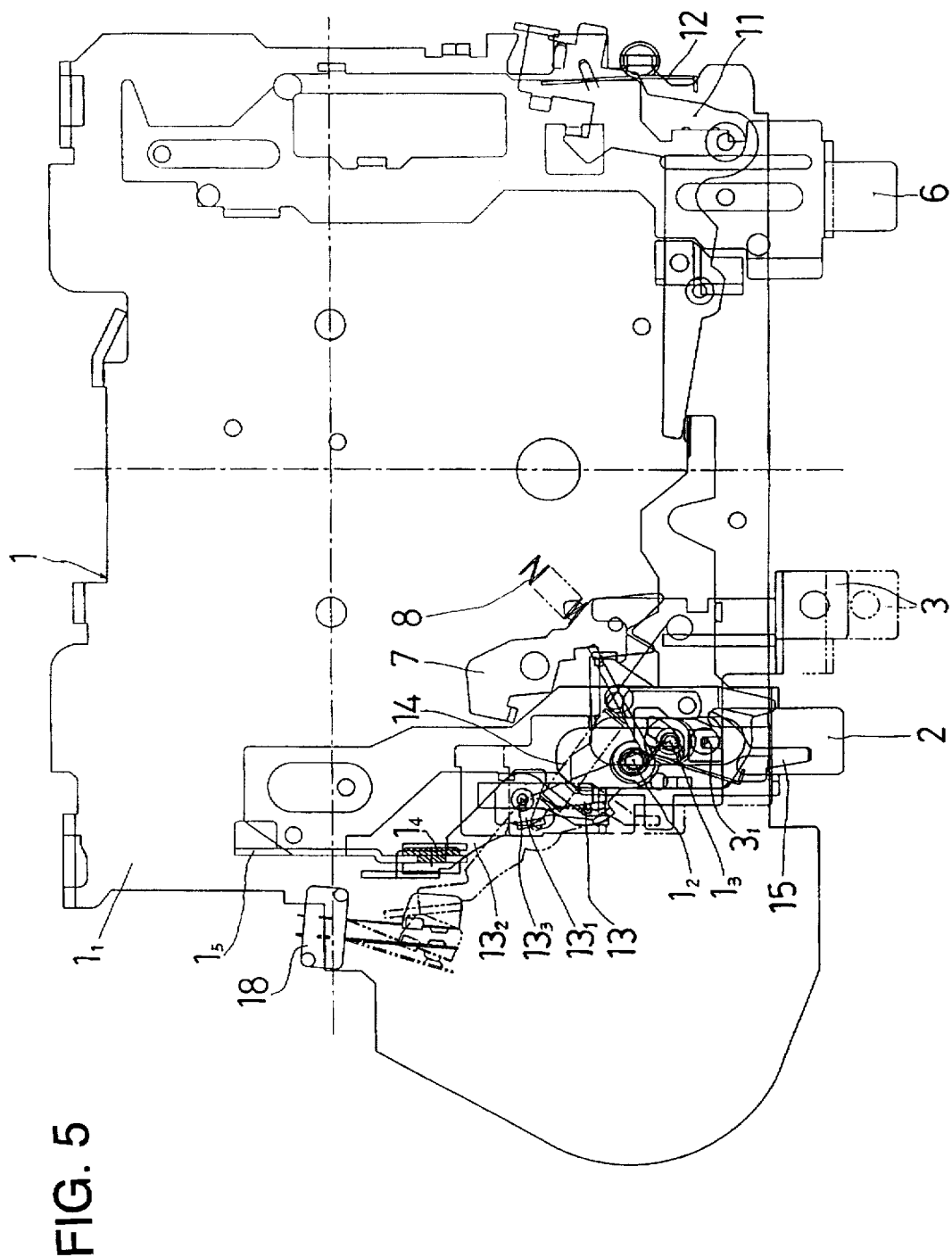
FIG. 5 is a plan view showing the pause mechanism in a pushed state.
Figure 6:
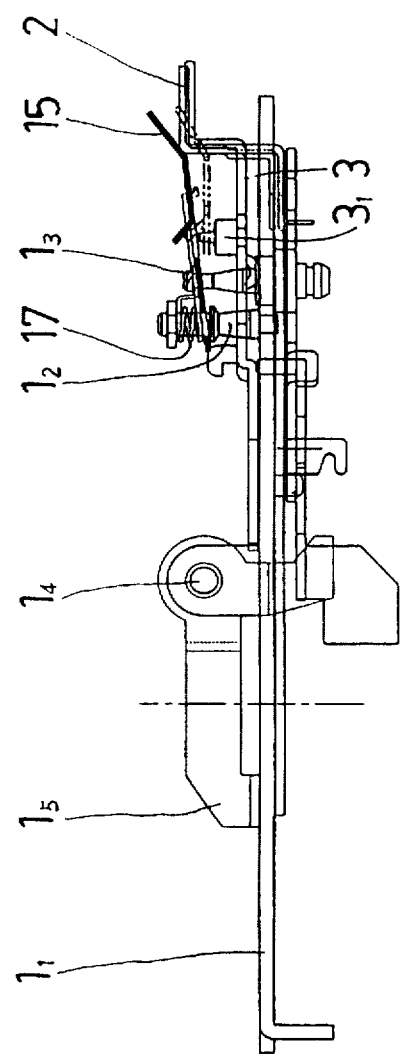
FIG. 6 is a side view of the pause mechanism in FIG. 5.
Figure 7:
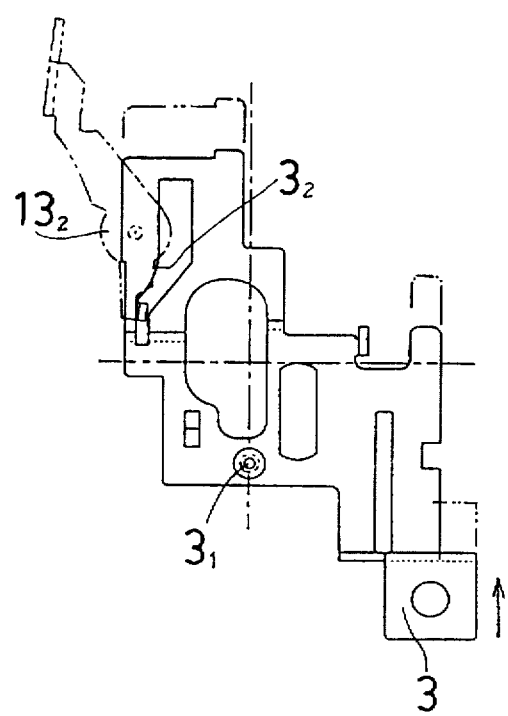
FIG. 7 is a front view of a pause lever.
Figure 8:
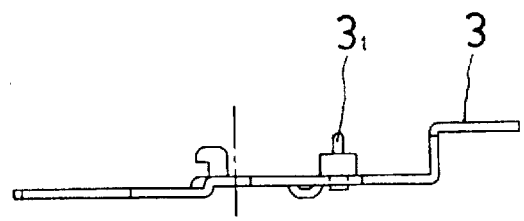
FIG. 8 is a side view of the pause lever in FIG. 7.
Figure 9:
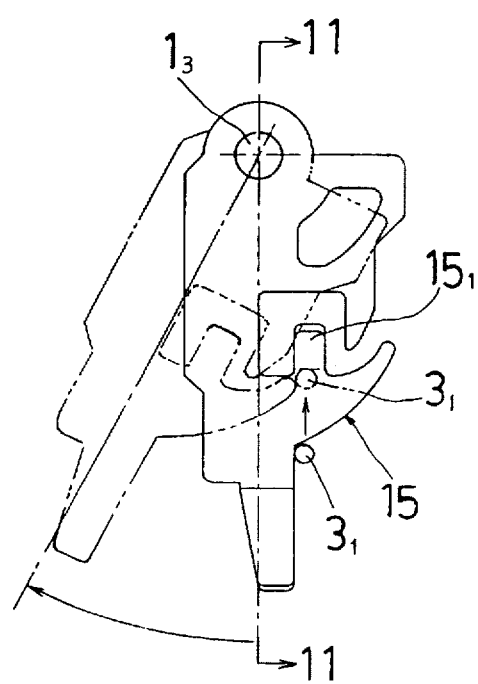
FIG. 9 is a front view of a lock
Figure 10:
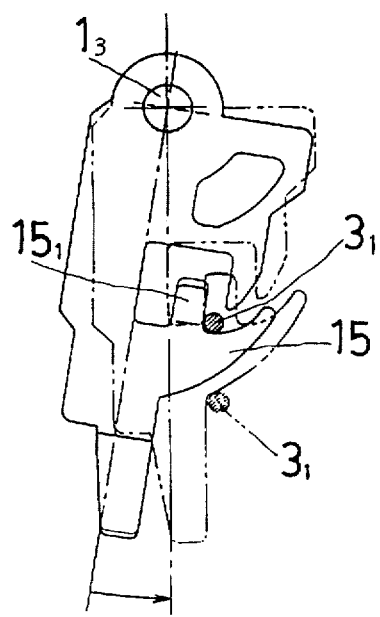
FIG. 10 is a front view illustrating the lock cam activated from the state in FIG. 9.
Figure 11:
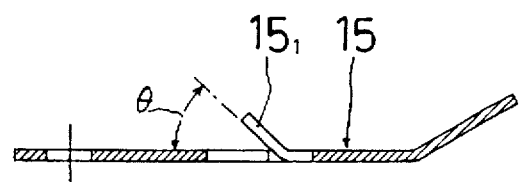
FIG. 11 is a cross-sectional view along the line 11—11 in FIG. 9.

A preferred embodiment of the present invention will now be described with reference to the accompanying drawings. FIG. 1 is a plan view showing a pause mechanism according to this invention installed in a cassette tape recorder, FIG. 2 is a side view of the pause mechanism in FIG. 1, FIG. 3 is a plan view showing the pause mechanism in a playback mode, FIG. 4 is a plan view showing the pause mechanism in a stop mode, FIG. 5 is a plan view showing the pause mechanism in a pushed state, FIG. 6 is a side view of the pause mechanism in FIG. 5, FIG. 7 is a front view of a pause lever, FIG. 8 is a side view of the pause lever in FIG. 7, FIG. 9 is a front view of a lock cam, FIG. 10 is a front view illustrating the lock cam activated from the state in FIG. 9; and FIG. 11 is a cross-sectional view along the line 11—11 in FIG. 9.

Referring to FIG. 1, a chassis 1 comprises a chassis plate $1_1$, a lock cam shaft $1_2$, a protraction/retraction shaft $1_3$, a connecting pin $1_4$ and an eject lever $1_5$.

The eject lever $1_5$ is designed to be rotatable in the opening direction around the connecting pin $1_4$ by the depression of a stop lever when a switch lever assembly 13 is in a power-OFF state.

A stop lever 2, provided on the chassis plate $1_1$, can make a non-lock motion and a slide motion in the upper direction of the chassis 1. The stop lever 2 is given a spring force in the return direction.

A pause lever 3 has a lock pin $3_1$ and is slidable upward. This pause lever 3 is urged by the force of a pause-lever spring 16 in the return direction, and can be pushed on and off by a lock cam spring 17.

A fast forward/fast rewind lever 4 is designed to be slidable in the right and left direction on the chassis 1. The fast forward/fast rewind lever 4 is locked at the center by a playback arm 9, a playback-arm stop spring 8 and a pinch shaft 19.

A playback lever 5 is slidable in the upper direction and is given a spring force in the return direction. This playback lever 5 is locked by a playback lock cam 7.

A record lever 6 is designed to be slidable in the upper direction of the chassis 1 and to be locked by a record lock arm 11 and a record lock spring 12.

The switch lever assembly 13 has switch levers $13_1$ and $13_2$ coupled together to be rotatable about a connecting shaft $13_3$. Those switch levers $13_1$ and $13_2$ are rockable about the lock cam shaft $1_2$ and are also slidable.

Reference numeral "114" denotes a switch lever spring 14. The lock cam 15 rotates about the lock cam shaft $1_2$ by the pushing action of the lock pin $3_1$ of the pause lever 3. The lock pin $3_1$ is designed to move under a lock cam pawl $15_1$ which is inclined at a predetermined angle θ.

A power switch 18 is switched on and off by the second switch lever $13_2$.

The specific operation of the pause mechanism according to this embodiment will now be discussed.

(1) Pause Mechanism

In FIG. 1, when the playback lever 5 or the record lever 6 is pushed, the switch lever $13_1$ rotates counterclockwise about the protraction/retraction shaft $1_3$ in responsive to the action of the playback lever 5 or the record lever 6. The switch-lever spring 14 pushes the switch lever $13_1$ against the protraction/retraction shaft $1_3$.

The second switch lever $13_2$, which sets the power switch 18 on or off, one end portion of the power switch 18 with respect to the connecting shaft $13_3$ as the center to the position where the power switch 18 is restricted by a cam $3_2$ of the pause lever 3 and is switched on. As the playback lever 5 is locked by the playback lock cam 7 in this situation, the switch lever assembly 13 is positioned and is held in that state. The playback-arm stop spring 8 provides force to lock the playback lock cam 7. That is, the playback lock cam 7 is locked by the force of the playback-arm stop spring 8.

When the pause lever 3 is depressed in this situation, the second switch lever $13_2$ rotates clockwise about the connecting shaft $13_3$ by the restriction by the cam $3_2$ formed on the pause lever 3, thereby switching off the power switch 18 (see FIG. 4).

The lock pin $3_1$ of the pause lever 3 causes the pause lever 3 to slide on the outer surface of the lock cam 15 to be locked.

The rocking amount of the switch lever $13_2$ is restricted by setting the cam $3_2$ of the pause lever 3, the connecting shaft $13_3$, the lock cam shaft $1_2$ and the protraction/retraction shaft $1_3$ to the optimal positions. Specifically, the rocking amount of the switch lever $13_2$ is set to the ON-OFF stroke of the power switch 18. Therefore, this pause lever 3 can be adapted for various kinds of switches.

(2) Pause Release Mechanism

In FIGS. 1, 7 and 8, when the pause lever 3 is pushed again, the lock cam 15 turns by the force of the lock-cam spring 17 at the position where the lock pin $3_1$ in FIGS. 9-11 has come under the lock cam pawl $15_1$, and the pause lever 3 goes over the tapered portion of the lock cam 15 to return to the original position shown in FIG. 7.

When the stop lever 2 is pushed in the state shown in FIG. 1, the lock cam 15 makes a gate motion with the lock cam shaft 12 as the fulcrum to unlock the lock pin $3_1$ and the lock cam 15. As a result, the pause lever 3 returns to the stop position.

At this time, the second switch lever $13_2$ becomes the state in FIG. 3 and the power switch 18 returns to the ON state.

If the switch lever $13_1$ is set to perform the same operation as the playback and record operation by the fast forward/fast rewind lever 4, the second switch lever $13_2$, the connecting shaft $13_3$ and the like in FIG. 1, the above-described pause mechanism accomplishes a pause function in the fast forward/fast rewind mode.

The pause mechanism with the above-described structures has the following technical advantages. A user can notice the ON/OFF state of the pause mechanism for a cassette tape recorder at a glance. If the user overlooks the ON/OFF state, however, the user can release this function by depressing the stop lever. This advantage can permit the user to avoid an erroneous usage of the pause mechanism and is very useful as a similar type of a pause mechanism for a cassette tape recorder.

What is claimed is:

1. A pause mechanism for a cassette tape recorder having a drive mechanism, said drive mechanism operable in a plurality of modes of operation including a record switch, a playback switch, a fast forward switch, a rewind switch, and a pause switch, comprising:

a power switch which selectively connects said drive mechanism to a power supply;

a first lever having a first position in which said first lever opens said power switch, and a second position in which said first lever closes said power switch;

a second lever, engaging said first lever, which moves said first lever between said first and second positions responsive to a change in state of at least said playback switch;

said pause switch having a cam groove which engages said first lever such that depression of said pause switch moves said first lever to said first position to open said power switch and disconnect said drive mechanism from said power supply.

2. The pause mechanism of claim 1, wherein, once said pause button is depressed, said drive mechanism remains disconnected from said power supply until said pause button is depressed again.

3. A pause mechanism for a cassette tape recorder having a drive mechanism for implementing modes including a record mode, a playback mode, a fast forward mode and a fast rewind mode, and a switch for enabling or disabling the modes, the pause mechanism comprising:

a pause lever; a lever for setting the enabling switch on or off, the lever consisting of two levers rotatable at an engaging portion, one of the two levers having a projection engageable with a heteromorphic hole provided in the pause lever such that forward and backward moving of the pause lever causes one of the rotatable levers to operate, whereby the enabling switch can be set on or off without operating each mode lever.

* * * * *